(12) United States Patent
Köster

(10) Patent No.: US 11,285,995 B2
(45) Date of Patent: Mar. 29, 2022

(54) YAW ANGLE MEASUREMENT DEVICE

(71) Applicant: SAF-HOLLAND GmbH, Bessenbach (DE)

(72) Inventor: Mario Sebastian Köster, Bodman-Ludwigshafen (DE)

(73) Assignee: SAF-Holland GmbH, Bessenbach (DE)

( * ) Notice: Subject to any disclaimer, the term of this patent is extended or adjusted under 35 U.S.C. 154(b) by 181 days.

(21) Appl. No.: 16/652,728

(22) PCT Filed: Sep. 25, 2018

(86) PCT No.: PCT/EP2018/075845
§ 371 (c)(1),
(2) Date: Apr. 1, 2020

(87) PCT Pub. No.: WO2019/072533
PCT Pub. Date: Apr. 18, 2019

(65) Prior Publication Data
US 2020/0239070 A1 Jul. 30, 2020

(30) Foreign Application Priority Data
Oct. 9, 2017 (DE) ...................... 10 2017 123 328.8

(51) Int. Cl.
*B62D 15/02* (2006.01)
*B60D 1/01* (2006.01)
(Continued)

(52) U.S. Cl.
CPC ........... *B62D 15/023* (2013.01); *B60D 1/015* (2013.01); *B60D 1/62* (2013.01); *B62D 13/025* (2013.01); *B62D 53/0842* (2013.01)

(58) Field of Classification Search
CPC .......................... B62D 15/023; B62D 13/025; B62D 53/0842; B62D 53/0871; B60D 1/015; B60D 1/30
(Continued)

(56) References Cited

U.S. PATENT DOCUMENTS 3,833,928 A * 9/1974 Gavit ....................... B60D 1/06
340/431
3,947,839 A * 3/1976 Zigmant .................. B60D 1/06
340/431
(Continued)

FOREIGN PATENT DOCUMENTS

DE 33742 6/1885
DE 19964045 A1 7/2001
(Continued)

OTHER PUBLICATIONS

European Patent Office; International Search Report; dated Dec. 4, 2018.

*Primary Examiner* — Kevin Hurley
*Assistant Examiner* — Hosam Shabara
(74) *Attorney, Agent, or Firm* — Price Heneveld LLP

(57) ABSTRACT

A yaw angle measuring device for a separable coupling for fifth wheel couplings includes a sensor element and a measuring arrangement, wherein the sensor element is configured to be arranged on a first coupling partner and the measuring arrangement is configured to be arranged on a second coupling partner, wherein the first coupling partner is configured to be mounted by the coupling arrangement such that the first coupling partner is rotatable about an axis of rotation relative to the second coupling partner, wherein the sensor element generates a measuring signal in the measuring arrangement which serves to determine the yaw angle about the axis of rotation.

20 Claims, 2 Drawing Sheets

(51) Int. Cl.
  *B60D 1/62* (2006.01)
  *B62D 13/02* (2006.01)
  *B62D 53/08* (2006.01)

(58) Field of Classification Search
  USPC ......................................................... 280/433
  See application file for complete search history.

(56) References Cited

U.S. PATENT DOCUMENTS

| | | | | |
|---|---|---|---|---|
| 5,536,030 | A * | 7/1996 | Bettini | B62D 13/025 |
| | | | | 280/426 |
| 6,956,468 | B2 * | 10/2005 | Lee | B60D 1/065 |
| | | | | 280/504 |
| 7,648,153 | B2 * | 1/2010 | Metternich | B62D 15/02 |
| | | | | 280/433 |
| 7,905,555 | B2 * | 3/2011 | Huntimer | B60D 1/305 |
| | | | | 303/7 |
| 8,917,170 | B2 * | 12/2014 | Padula | B62D 53/08 |
| | | | | 340/431 |
| 2017/0115133 | A1 * | 4/2017 | Batista | G01D 5/145 |

FOREIGN PATENT DOCUMENTS

| | | |
|---|---|---|
| DE | 20306787 U1 | 10/2004 |
| DE | 102010054958 A1 | 6/2012 |
| DE | 102014224808 A1 | 6/2016 |
| DE | 102016012663 A1 | 6/2017 |
| GB | 2470610 A | 12/2010 |
| WO | 2004096623 A1 | 11/2004 |

\* cited by examiner

YAW ANGLE MEASUREMENT DEVICE

BACKGROUND OF THE INVENTION

The invention relates to a yaw angle measuring device for a separable coupling arrangement, in particular for fifth wheel couplings.

Yaw angle measuring devices serve to determine the relative yaw angle between two vehicles, in particular the pulling vehicle and a semi-trailer of a tractor-trailer unit, wherein the yaw angle is the angle about the normal of the driving plane. The identification of the relative yaw angle serves, amongst other things, for the identification of critical driving conditions and the implementation of suitable countermeasures. In this case, the measuring systems known from the prior art require a large installation space, thereby restricting the maneuverability of the tractor-trailer unit, amongst other things.

It is therefore the object of the present invention to provide a yaw angle measuring device which has only a low spatial requirement.

SUMMARY OF THE INVENTION

According to the invention, a yaw angle measuring device for a separable coupling arrangement, in particular for fifth wheel couplings, comprises a sensor element and a measuring arrangement, wherein the sensor element is arranged or can be arranged on a first coupling partner and the measuring arrangement is arranged or can be arranged on a second coupling partner, wherein the first coupling partner is designed to be mounted by means of the coupling arrangement such that it is rotatable about an axis of rotation relative to the second coupling partner, wherein the sensor element generates a measuring signal in the measuring arrangement, which serves to determine the yaw angle about the axis of rotation. In this case, the separable coupling arrangement is a coupleable and uncoupleable coupling arrangement, which, in the coupled state, is capable of transmitting a pulling force from one vehicle part to another. In particular, this coupling arrangement is a fifth wheel coupling, which is used in particular in semi-trucks of utility vehicles. The vehicle parts which can be connected by means of the coupling arrangement can be formed, in particular, by a pulling vehicle and a trailer or semi-trailer or by two trailers. In this case, the pulling force which can be transmitted by the coupling arrangement is, in particular, the force which moves the pulled vehicle forwards. The first or the second coupling partners serve to mutually connect the two vehicle parts to be coupled such that a pulling force can be transmitted between them. The two coupling partners can be formed, in particular, by a kingpin on the trailer side and by the coupling elements on the pulling-vehicle side, in particular by a fifth wheel coupling on the pulling-vehicle side. The decisive factor in this case is that one of the two coupling partners is arranged, or is designed to be arranged, on the first vehicle part and the other coupling partner is arranged, or is designed to be arranged, on the other vehicle part. The axis of rotation about which the first coupling partner is mounted to be rotatable relative to the second coupling partner by means of the coupling arrangement is, in particular, the vertical axis about which the yaw angle is determined. The sensor element of the yaw angle measuring device is an element which serves to generate a measurement in the measuring arrangement. In other words, a measuring signal, which is produced as a result of the interaction with the sensor element, is produced in the measuring arrangement. In this case, the generation of this measurement preferably takes place contactlessly or, alternatively preferably, via contact between the sensor element and the measuring arrangement. For example, the sensor element can therefore form a contact or deflect or emit an information carrier, in particular a non-physical information carrier, such as ultrasound or field lines of a magnetic field, for example, such that this can be detected in the measuring arrangement. In this case, the sensor element is arranged indirectly or directly on the first coupling partner. The sensor element is preferably free of a measuring-signal connection and/or an energy connection, meaning that it has no connection by means of which measuring signals and/or energy can pass from or into the sensor element. In other words, this means the sensor element can represent a passive element. A particularly failsafe sensor element is therefore achieved. The measuring arrangement is the element of the yaw angle measuring device in which the measuring signal is produced by means of which the yaw angle is determined. In this case, the actual determination can take place directly or via an evaluation algorithm. This evaluation algorithm can be advantageously implemented using a data processing system. The measuring arrangement is characterized in particular in that it has a data line or a data bus by means of which the measuring signal can be relayed or conducted from the measuring arrangement. It is particularly preferred if the measuring arrangement represents a purely receiving element so that it does not emit an information carrier, but merely receives it. In other words, the measuring arrangement is therefore preferably a converter which converts the information carrier into a measuring signal, in particular an analog or digital electrical measuring signal. The direct or indirect arrangement of the sensor element and the measuring arrangement on the coupling partners results in a particularly compact yaw angle measuring device. In an exemplary embodiment, the sensor element can be formed, for example, by a magnet, in particular a permanent magnet. The measuring arrangement in this exemplary embodiment can possess a further magnet, the alignment of which is measured, in particular, by a potentiometer. The advantage of this embodiment consists in that this exemplary embodiment does not make use of the Hall effect, so that a time-wise stationary state can be measured. In this case, the yaw angle measuring device is preferably arranged substantially within the space or the installation space which extends between the lower edge of the kingpin to the upper edge of the coupling plate or to the lower edge of the screw shoulder of the kingpin.

The first coupling partner and the second coupling partner preferably have force-transmitting surfaces, wherein the force-transmitting surfaces are designed to transmit forces from the first coupling partner to the second coupling partner in an exit direction and/or in a transverse direction, and wherein the sensor element and the measuring arrangement are arranged outside, in particular above and/or below, the force-transmitting surfaces. In this case, the exit direction is, in particular, the direction in which the two coupling partners have to be moved so that they can be uncoupled from one another. Therefore, in a fifth wheel coupling, the exit direction is, in particular, the direction in which the kingpin has to be moved from the retaining or coupling position in the direction of the exit or entry opening relative to the fifth wheel coupling plate in order to be uncoupled. Therefore, the exit direction is, particularly preferably, the direction which is contrary to the entry direction. The entry direction, on the other hand, is, in particular, the direction in which the vehicle travels in the pulling direction. In this case, the pulling direction is, in particular, the direction in which the pulling vehicle moves during forward travel. In this case, the exit direction and the entry direction are preferably substantially perpendicular to the axis of rotation. In this case, "substantially perpendicular", within this context, means that the exit direction or the entry direction can form an angle of 80°-100° with the axis of rotation. In this case, the transverse direction is substantially perpendicular to the exit direction and the axis of rotation. In other words, this means that the transverse direction is the direction in which the width of the vehicles which are connected or are to be connected by means of the coupling arrangement is determined when traveling straight ahead. The force-transmitting surfaces of the first or the second coupling partner are therefore those surfaces which serve to transmit a pulling force from one vehicle part to the other. The force-transmitting surfaces are therefore formed, in particular, by the surfaces of the kingpin and a coupling closure unit which can establish contact with one another. In particular, in this case, the force-transmitting surfaces within the context of the present invention are not the surfaces which come into contact upon a displacement of the two coupling partners in the entry direction, such as is the case, for example, when braking. Therefore, in particular, the wear ring of the fifth wheel coupling does not represent a force-transmitting surface. The sensor element and the measuring arrangement are preferably arranged outside these force-transmitting surfaces, in particular above or below these surfaces, wherein above or below relates, in particular, to the direction in which the axis of rotation points. In this case, "arranged outside", within this context, means that these are neither arranged on the force-transmitting surfaces nor in contact therewith. It is thus achieved that the sensor element and the measuring arrangement are at least only slightly loaded by the forces to be transmitted in the pulling direction during the pulling procedure, so that a long useful life of the yaw angle measuring device can be achieved. To save on installation space, it is particularly preferred if the measuring arrangement is arranged on the wear ring and/or in which the yaw angle can be detected or measured by the yaw angle measuring device.

The measuring arrangement expediently extends in a range of at least +89° to −89°, preferably of +45° to −45° and particularly preferably in a range of +15° to −15° about the axis of rotation. In this case, the zero point of this angle of extent is expediently in or along the entry direction. With an angle of extent of +89° to −89°, a particularly large measuring range is enabled, resulting in extremely reliable monitoring of the yaw angle. With an angle of extent about the axis of rotation of at least +45° to −45°, it is ensured that the yaw angle can also be detected during maneuvers for negotiating turns, in particular shunting maneuvers. With an angle of extent of +15° to −15°, the yaw angle detection achieved covers the particularly critical driving situations, but has only a low spatial requirement. In this case, the angle of extent is, in particular, the angle about the axis of rotation which is surrounded by the measuring arrangement on both sides.

The sensor element is advantageously connected or can be advantageously connected to the first coupling partner in a rotationally fixed manner. Alternatively or additionally, the measuring arrangement is also connected or can be also connected to the second partner in a rotationally fixed manner. As a result of this rotationally fixed arrangement, in particular in relation to the axis of rotation—about which the yaw angle is measured—or alternatively about all potential axes of rotation, it is achieved that a relative rotation between the sensor element and the first coupling partner or the measuring arrangement and the second coupling partner, which can lead to measuring errors, is unable to take place. It is particularly preferred if the connection between the first coupling partner and the sensor element and/or the second coupling partner and the measuring arrangement is designed to be immovable so that neither a displacement nor a rotation between the connecting partners is able to take place. This ensures a particularly low-wear connection since abrasive wear cannot occur.

The sensor element preferably has a projection, which projects in a direction perpendicular to the axis of rotation and in the direction of the second coupling partner. A particularly space-saving sensor element, and therefore a space-saving yaw angle measuring device, can therefore be achieved. In this case, the projection can be formed by a lug, an eccentricity or by an oval or cam-like outer contour. This projection is preferably arranged on the sensor element or on the first coupling partner such that, when driving straight ahead, it points in the direction of the entry direction or in the direction of the exit direction. This enables particularly simple calibration control to take place.

The projection expediently extends from an outer surface which is rotationally symmetrical with respect to the axis of rotation, at least in some regions. As a result of the rotationally symmetrical configuration of the outer surface, it can be achieved that this does not exhibit any external changes in appearance or in terms of its installation-space requirement during a steering or maneuvering movement. It goes without saying in this case that the rotational symmetry does not include the projection; therefore, this rotational symmetry only relates to the regions of the outer surface which are not formed by the projection. In this case, it is particularly preferred if the outer surface is completely rotationally symmetrical about the axis of rotation—apart from the, in particular, one projection—thereby resulting in cost-effective manufacture.

The first coupling partner is preferably a kingpin, wherein the sensor element is part of the kingpin or is formed by a sleeve which encompasses the kingpin at least in some regions, preferably completely. Particularly good accessibility of the sensor element can thus be achieved so that costs for maintenance and assembly can be reduced. Alternatively, the sensor element can also be at least partially, preferably completely, incorporated in the kingpin. This can take place, for example, by arranging the sensor element in a bore of the kingpin. It is thus achieved that the sensor element is protected by the outer dimensions of the kingpin.

The sensor element is preferably in direct contact with the measuring arrangement, and wherein this direct contact generates the measuring signal in the measuring arrangement. A particularly high degree of reliability and dependability in terms of the measurement of the yaw angle can thus be achieved. In other words, the yaw angle measuring device in this case is a contacting measuring apparatus, which is formed by the sensor element and the measuring arrangement. In this case, this direct contact particularly preferably takes place without a connection, i.e. such that, when uncoupling the coupling partners (separating the coupling partners), it is not necessary to separate connections between the sensor element and the measuring arrangement. The uncoupling process can thus be accelerated, thereby saving money. In particular, connection-free contacts can also be characterized in that only pressure stresses can be transmitted thereby and tensile stresses cannot occur. It is particularly preferred if the direct contact is realized extensively. This results in a decrease in the local surface pressures, thereby resulting in a particularly stable and durable yaw angle measuring device. Amongst other things, extensive contact can mean that a geometrically cohesive contact surface has a size of at least 5 cm². It is particularly preferred if the contact in this case is configured such that it is pre-stressed in a coupled state. It can thus be ensured that the sensor element is always in contact with the measuring arrangement, thereby resulting in a particularly failsafe yaw angle measuring device. In particular, the contact in this case should be configured such that it is preferably also pre-stressed during acceleration and/or braking. Additionally or alternatively, the prestress can also be used to calibrate the measuring arrangement.

In a preferred embodiment, the measuring arrangement possesses a deformation component and a detection arrangement, wherein the deformation component is designed to come into direct contact with part of the sensor element, in particular the projection, and wherein the detection arrangement serves to determine the location of the contact. In this case, the deformation component of the measuring arrangement is preferably formed from an elastic material, which is designed to be deformed. The deformation component is therefore expediently formed from a polymeric material to reduce the production costs and promote the deformability of the deformation component. In this case, the deformation component is preferably designed to only be deformed in some regions, which means, in particular, that it is not a spring. The deformation component is expediently designed at least in the form of a ring segment, wherein, in this case, the ring segment surrounds the axis of rotation at least in some regions. In this case, the detection unit makes use of the induced mechanical stress or the deformation of the deformation component to determine the location of the contact. The detection arrangement can therefore be formed in particular by piezo elements or by strain gauges. The detection arrangement is preferably surrounded by the deformation component, at least in some regions. The generally sensitive detection arrangement is therefore protected by the deformation component. In particular, the deformation component in this case surrounds the detection arrangement such that only the deformation component can establish contact with the sensor element. It is particularly preferred if the detection arrangement possesses different measuring sections or measuring points or measuring elements, which are arranged or can be arranged, in particular, in the form of a ring segment about the axis of rotation. It is thus achieved that the individual measuring points or measuring elements of the detection arrangement can operate separately from one another in each case, thereby reducing the likelihood of the measuring arrangement failing. It is particularly preferred if the measuring elements or measuring points, in particular in the form of piezo elements or strain gauges, are arranged in such proximity to one another, in particular in the circumferential direction, that a deformation of the deformation component, at least in the coupled state, results in a measuring signal in at least two measuring elements or measuring points.

The detection arrangement is advantageously formed by piezo elements. A particularly low-wear and low-maintenance detection arrangement can thus be achieved.

The measuring arrangement preferably has a plurality of electrical contacts, in particular extending parallel to the axis of rotation, wherein the sensor element can be brought into engagement with the electrical contacts such that the sensor element connects two of these electrical contacts directly or indirectly in a conductive manner. This makes use of a particularly simple and fault-resistant measuring principle, resulting in a particularly reliable yaw angle measuring device. In this case, the sensor element can connect the electrical contacts directly in a conductive manner, so that the sensor element is itself formed as part of this conductive connection. Alternatively preferably, the sensor element can also establish this conductive contact directly, for example as a result of a deformation of the component or region encompassing the electrical contacts. In this case, the projection of the sensor element is particularly preferably the part of the sensor element which connects the electrical contacts directly or indirectly in a conductive manner. To achieve particularly good protection of the electrical contacts, it is expedient if the electrical contacts, or the elements encompassing these, are, in this case, arranged as a detection arrangement within an already described deformation component. In other words, this means that the electrical contacts in this embodiment only come into indirect contact with the sensor element.

A gap is expediently formed between the sensor element and the measuring arrangement. In other words, this means that direct contact between the sensor element and the measuring arrangement does not place. A contactless measuring method is thus enabled. As a result of this contactless measuring method, a particularly low-wear yaw angle measuring device is achieved, which therefore has a particularly long useful life. The contactless measuring method can be achieved, for example, by making use of magnetism. Amongst other things, this can be achieved by exploiting the Hall effect or by detecting the polarities of a magnet, in particular a permanent magnet.

In a preferred embodiment, the measuring arrangement comprises an optical detection arrangement. In other words, this means that the yaw angle measuring device uses a contactless optical measuring method. In this case, the yaw element is preferably designed as a passive element. This can be realized, for example, via the application of an optically detectable pattern. An optically detectable pattern can be formed, for example, by a barcode, a color code or a line code or alternatively by one or more depressions or steps. In this case, it is particularly preferred if the optically detectable pattern is formed by the already described projection. Alternatively preferably, the sensor element can also be formed as an active element. In other words, this means, within this context, that the sensor element comprises a light source. For example, the sensor element can therefore comprise a laser or a stroboscopic light. In this case, the detection arrangement preferably at least possesses an optical capture device, for example a camera. In addition, the detection arrangement can also possess a light source, wherein, in this embodiment, the sensor element generally fulfills a purely reflective function. Alternatively preferably, the light source can also be arranged in a separate component or element. In this case, the use of an optical measuring method has the advantage that, due to the measuring apparatus used in this case, no other sensors in the coupling region are disturbed, as happens, for example, in a magnetic or electrical measuring arrangement.

A further aspect of the invention relates to a utility vehicle having a yaw angle measuring device such as has already been described.

BRIEF DESCRIPTION OF THE DRAWINGS

The further advantages and features of the present invention are revealed in the description below with reference to the accompanying figures. Individual features disclosed in the embodiments shown can also be used in other embodiments unless this is expressly ruled out. The figures show.

DETAILED DESCRIPTION OF THE PREFERRED EMBODIMENTS

Figure 1:
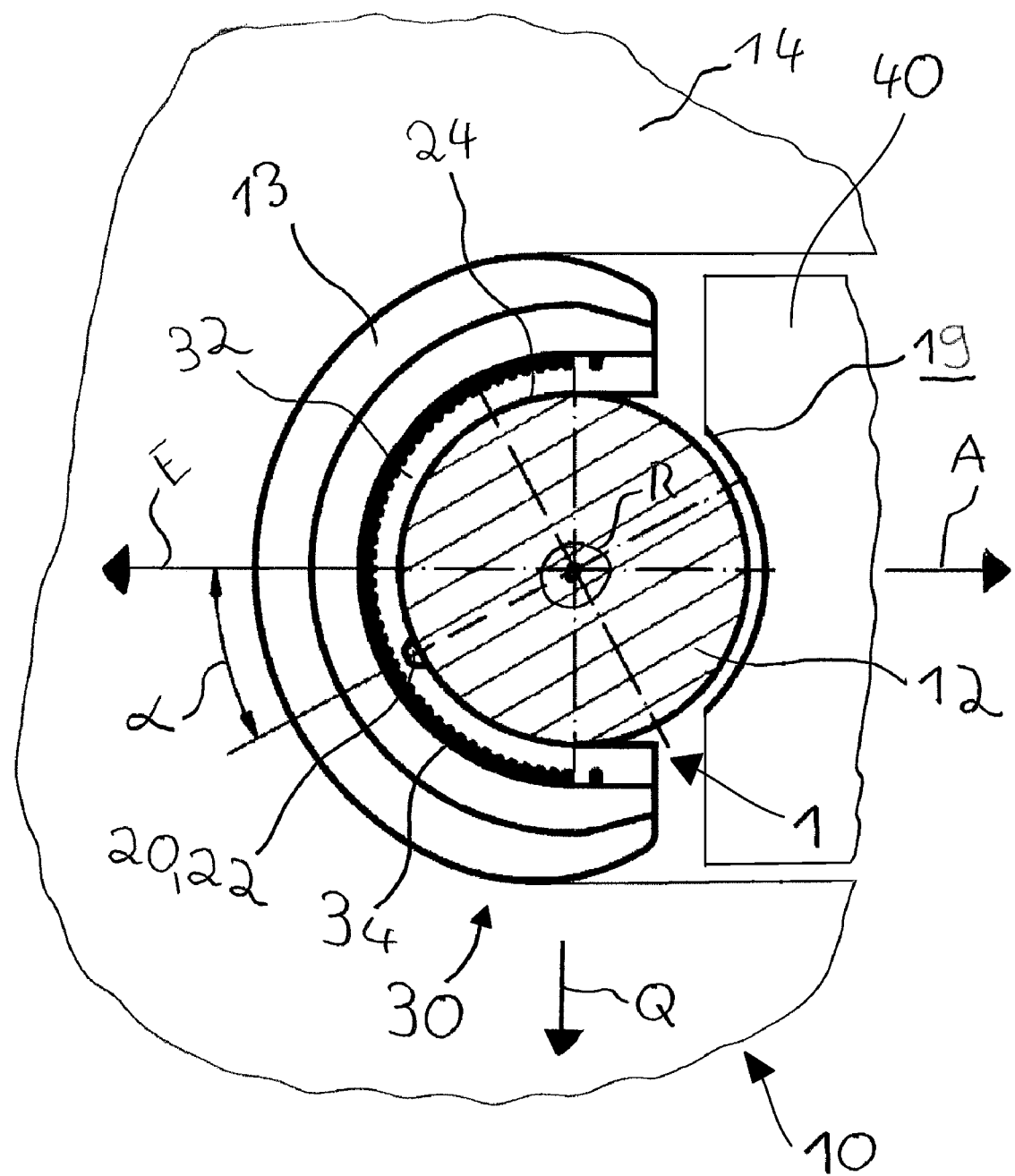
FIG. 1 is a partial, cross-section top plan view of a coupling arrangement which possesses a yaw angle measuring device according to the invention.

In FIG. 1, a section through a coupling arrangement 10 is shown, which possesses a yaw angle measuring device 1. The coupling arrangement 10 comprises, amongst other things, a first coupling partner 12 in the form of a kingpin, which extends along the axis of rotation R, and a second coupling partner 14 in the form of a fifth wheel coupling. In this case, the first coupling partner 12 has been inserted into the second coupling partner 14 along the entry direction E. To prevent a displacement of the first coupling partner 12 in the direction of the exit direction A, the second coupling partner 14 possesses a force-transmitting surface 19. In this case, the yaw angle measuring device 1 serves to determine the relative yaw angle α between the first coupling partner 12 and the second coupling partner 14. In the illustrated embodiment, the sensor element 20 of the yaw angle measuring device 1 possesses a projection 22 which is arranged directly on an outer surface 24 of the first coupling partner 12. In this case, the sensor element 20 is constructed in one piece with the first coupling partner 12. In this case, the projection 22 is in direct contact with a deformation component 32 in the form of a ring segment, which is therefore arranged between the first coupling partner 12 and a wear ring 13. A detection arrangement 34 is likewise arranged between the wear ring 13 and the first coupling partner 12. In this case, the detection arrangement 34 extends in the form of a half ring from a positive transverse direction Q over the entry direction E to the negative transverse direction Q, wherein the transverse direction Q is perpendicular to the entry direction E, the axis of rotation R and the exit direction A.

Figure 2:
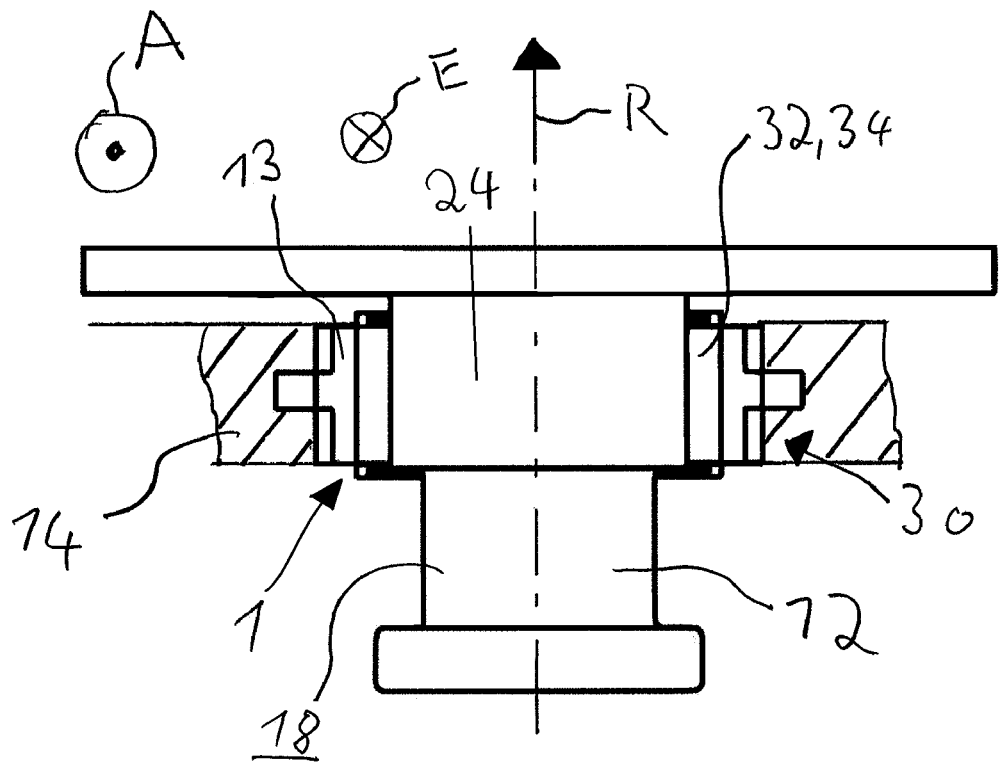
FIG. 2 is a partial, cross-section side elevation view of a further embodiment of a yaw angle measuring device according to the invention.

A partial sectional view is shown in FIG. 2, in which a yaw angle measuring device 1 is present, wherein the illustrated partial section could match the embodiment shown in FIG. 1. In the embodiment illustrated in FIG. 2, the first coupling partner 12 is in turn formed as a kingpin, which possesses force-transmitting surfaces 18. In this case, the yaw angle measuring device 1 is formed in part by a measuring arrangement 30 in the second coupling partner 14, which has a deformation component 32 and a detection arrangement 34. In this case, the deformation component 32 surround the detection arrangements 34, so that the first coupling partner 12 only establishes contact with the deformation component 32.

Figure 3:
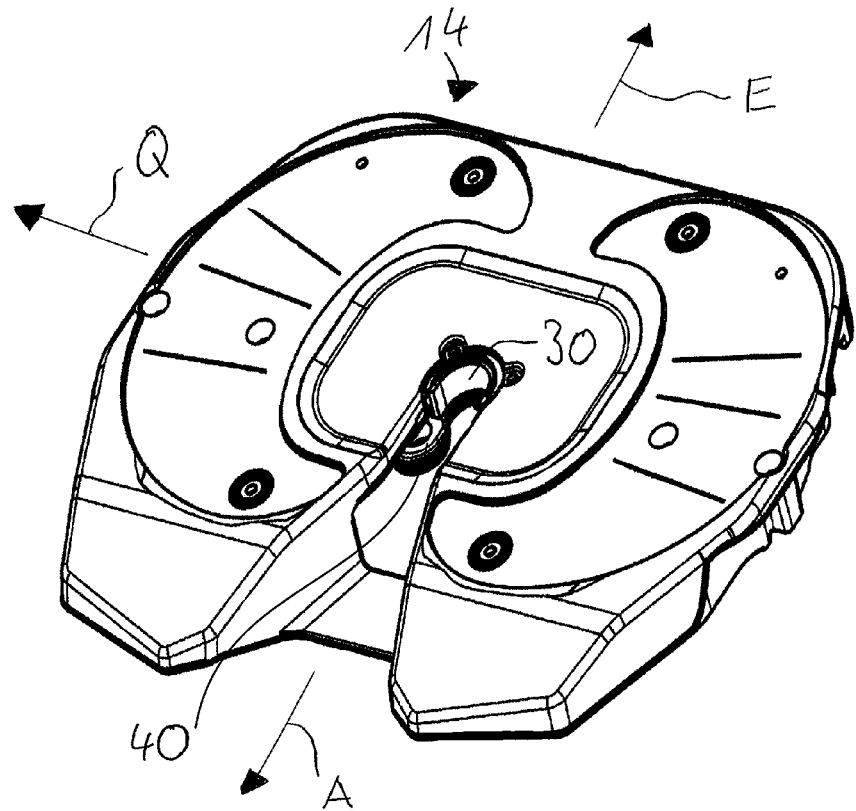
FIG. 3 is a top perspective view of a second coupling partner, which possesses a measuring arrangement.

A perspective view of a second coupling partner 14 in the form of a fifth wheel coupling is illustrated in FIG. 3. In the illustrated embodiment of the second coupling partner 14, the measuring arrangement 30 can be seen at the outer end in the entry direction E of the entry opening. In this case, the second coupling partner 14 possesses a coupling lock 40, which serves to be able to hold the first coupling partner (12) (not illustrated) with form fit and to thereby lock the coupling. In principle, the embodiment of the measuring arrangement 30 illustrated in FIG. 3 would, in this case, match the sections in FIG. 1 and FIG. 2.

LIST OF REFERENCE SIGNS

1—Yaw angle measuring device
10—Coupling arrangement
12—First coupling partner
13—Wear ring
14—Second coupling partner
18—Force-transmitting surfaces of the first coupling partner (12)
19—Force-transmitting surfaces of the second coupling partner (14)
20—Sensor element
22—Projection
24—Outer surface
30—Measuring arrangement
32—Deformation component
34—Detection arrangement
40—Coupling lock
A—Exit direction
E—Entry direction
Q—Transverse direction
R—Axis of rotation
α—Yaw angle

The invention claimed is:

1. A yaw angle measuring device for a separable vehicle coupling, comprising:
a sensor element; and
a measuring arrangement;
wherein the sensor element is configured to be arranged on a first coupling partner and the measuring arrangement is configured to be arranged on a second coupling partner;
wherein the first coupling partner is configured to be mounted by the coupling arrangement such that the first coupling partner is rotatable about an axis of rotation relative to the second coupling partner;
wherein the sensor element generates a measuring signal in the measuring arrangement which serves to determine the yaw angle about the axis of rotation;
wherein the sensor element is in direct contact with the measuring arrangement; and
wherein this direct contact generates the measuring signal in the measuring arrangement.

2. The yaw angle measuring device as claimed in claim 1, wherein the first coupling partner and the second coupling partner have force-transmitting surfaces, wherein the force-transmitting surfaces are configured to transmit forces from the first coupling partner to the second coupling partner in an exit direction and/or in a transverse direction, and wherein the sensor element and the measuring arrangement are arranged outside the force-transmitting surfaces.

3. The yaw angle measuring device as claimed in claim 2, wherein the sensor element and the measuring arrangement are arranged above and/or below the force-transmitting surfaces.

4. The yaw angle measuring device as claimed in claim 1, wherein the measuring arrangement extends in a range of at least +/−89° about the axis of rotation.

5. The yaw angle measuring device of claim 4, wherein the range is +/−45°.

6. The yaw angle measuring device of claim 5, wherein the range is +/−15°.

7. The yaw angle measuring device as claimed in claim 1, wherein the sensor element is configured to be connected to the first coupling partner in a rotationally fixed manner.

8. The yaw angle measuring device as claimed in claim 1, wherein the measuring arrangement is configured to be connected to the second coupling partner in a rotationally fixed manner.

9. The yaw angle measuring device as claimed in claim 1, wherein the sensor element has a projection which projects in a direction perpendicular to the axis of rotation and in a direction of the second coupling partner.

10. The yaw angle measuring device as claimed in claim 1, wherein the projection extends from an outer surface which is rotationally symmetrical with respect to the axis of rotation, at least in some regions.

11. The yaw angle measuring device as claimed in claim 1, wherein the first coupling partner includes a kingpin, and wherein the sensor element is part of the kingpin or is formed by a sleeve which encompasses the kingpin at least in some regions.

12. The yaw angle measuring device of claim 11, wherein the sleeve completely encompasses the kingpin.

13. The yaw angle measuring device as claimed in claim 1, wherein the measuring arrangement includes a deformation component and a detection arrangement, wherein the deformation component is configured to come into direct contact with part of the sensor element, and wherein the detection arrangement determines the location of the contact.

14. The yaw angle measuring device of claim 13, wherein the deformation is configured to come into direct contact with the projection.

15. The yaw angle measuring device as claimed in claim 13, wherein the detection arrangement includes piezo elements.

16. The yaw angle measuring device as claimed in claim 1, wherein the measuring arrangement has a plurality of electrical contacts, and wherein the sensor element is configured to be brought into engagement with the electrical contacts such that the sensor element connects two of these electrical contacts directly or indirectly in a conductive manner.

17. The yaw angle measuring device of claim 16, wherein the electrical contacts extend parallel to the axis of rotation.

18. A separable vehicle coupling that includes the yaw angle measuring device of claim 1.

19. A fifth wheel coupling that includes the yaw angle measuring device of claim 1.

20. A utility vehicle comprising a yaw angle measuring device as claimed in claim 1.

* * * * *